(12) United States Patent
Jonak et al.

(10) Patent No.: US 11,550,954 B1
(45) Date of Patent: Jan. 10, 2023

(54) DATA PROTECTION SYSTEMS

(71) Applicant: UIPCO, LLC, San Antonio, TX (US)

(72) Inventors: Sumita T. Jonak, San Antonio, TX (US); Pooja Krishnaswamy, Cedar Park, TX (US); Christopher Russell, San Antonio, TX (US); Gabriel Carlos Fernandez, San Antonio, TX (US); Joel S. Hartshorn, Olalla, WA (US); Thomas Wayne Schwarz, Jr., Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 257 days.

(21) Appl. No.: 17/084,390

(22) Filed: Oct. 29, 2020

Related U.S. Application Data

(60) Provisional application No. 62/927,313, filed on Oct. 29, 2019.

(51) Int. Cl.
| | | |
|---|---|---|
| *G06F 21/62* | (2013.01) | |
| *G06F 21/32* | (2013.01) | |
| *G06F 21/78* | (2013.01) | |
| *G06F 21/84* | (2013.01) | |

(52) U.S. Cl.
CPC .......... *G06F 21/6254* (2013.01); *G06F 21/32* (2013.01); *G06F 21/78* (2013.01); *G06F 21/84* (2013.01)

(58) Field of Classification Search
CPC ...... G06F 21/6254; G06F 21/32; G06F 21/78; G06F 21/84
See application file for complete search history.

(56) References Cited

U.S. PATENT DOCUMENTS

2015/0009248 A1\* 1/2015 Bracalente ............. G06F 21/16
  345/691

\* cited by examiner

*Primary Examiner* — Philip J Chea
*Assistant Examiner* — Austin W Collier
(74) *Attorney, Agent, or Firm* — Perkins Coie LLP

(57) ABSTRACT

Corporate information technology (IT) networks can protect sensitive data sent to computers located outside of the corporate IT network. For example, a computer located outside of the corporate IT network may receive a message that instructs the computer to operate in a data protection mode in which the computer reduces a frame rate of a monitor of the computer from a first frame rate to a lower second frame rate. In this example, the computer receives sensitive information that includes sensitive visual content to be displayed on the monitor and displays the sensitive visual content on the monitor configured to operate at the second frame rate.

18 Claims, 4 Drawing Sheets

US 11,550,954 B1

DATA PROTECTION SYSTEMS

CROSS-REFERENCE TO RELATED APPLICATION(S)

This application is a non-provisional of and claims priority to U.S. Provisional Application No. 62/927,313, filed on Oct. 29, 2019, entitled "DATA PROTECTION SYSTEMS," which is hereby incorporated by reference in its entirety for all purposes.

TECHNICAL FIELD

This disclosure is directed generally to systems, methods, and apparatuses for providing data security.

BACKGROUND

Many companies and organizations have set up their corporate information technology (IT) networks so that their employees can work from any place that has Internet access. To remotely access a corporate IT network, an employee may be required to log into a computer using credentials, such as a username and password. Today, employees regularly log into and access their corporate networks from home, coffee shops, or airports. For example, a consultant who regularly travels may use his or her laptop to access certain documents or send and receive emails at an airport or hotel. In another example, a software engineer can avoid rush-hour traffic in the morning by writing or reviewing software code from home or coffee shop until after the traffic subsides. Technology has made it possible for employees to have the flexibility to work from any place that has Internet access including their corporate offices. However, companies and organizations that offer remote access capabilities to their employees also face certain security risks. For example, an employee's laptop and credentials may be stolen and used to download confidential corporate information, or an employee may himself or herself remotely log into the corporate network for such nefarious purposes. In another example, an employee may be legitimately using his or her laptop in a coffee shop only to have a stranger take pictures of the employee's laptop screen to obtain confidential information.

Figure 1:
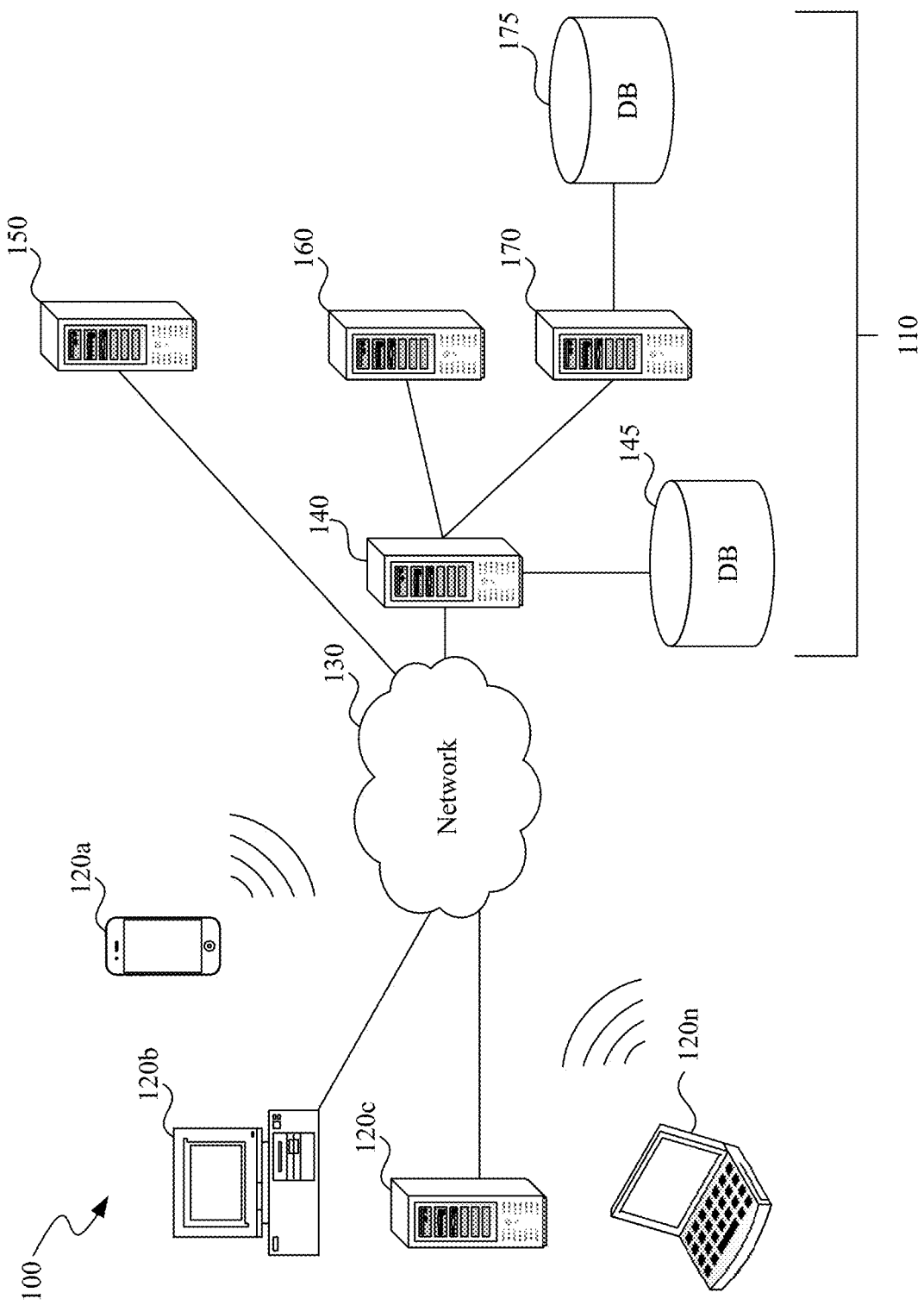
FIG. 1 shows an example system where one or more user devices remotely access a network system.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Employers are increasingly allowing their employees to work remotely which poses certain security risks. For example, a person can take pictures or record audio content of sensitive information (e.g., social security number, home address, credit card numbers, etc.) about a person when it such information is presented on a computer belonging to a remote employee. In another example, sensitive information can include confidential information relating to a business or government. This patent document describes example systems, methods, and apparatus that can provide data protection to deter an unauthorized person from accessing sensitive information from a computer. For example, in Section I below, this patent document describes image processing techniques to protect a person's sensitive information displayed on a monitor, where the monitor is associated with a computer that may be operated by a remote person (e.g., employee, contractor). In Section II, this patent document describes systems, methods, and apparatus to protect sensitive information about a person by displaying sensitive visual content included in the sensitive information in a digital eyeglass, where the digital eyeglass can be worn by and can authenticate a remote person. In Section III, this patent document describes systems, methods, and apparatus to protect sensitive information by sending a sensitive audio content included in the sensitive information to a headphone, where the headphone can be worn by a remote person. The example headings for the various sections below are used to facilitate the understanding of the disclosed subject matter and do not limit the scope of the claimed subject matter in any way. Accordingly, one or more features of one example section can be combined with one or more features of another example section.

I. Data Protection Image Processing

FIG. 1 shows an example system 100 where one or more user devices 120a to 120n remotely access a corporate network system 110. Although labeled "corporate" network system, corporate network system 110 can be any network system such as government network system and the techniques described herein can be used to protect any sensitive data, including but not limited to sensitive data related to a person, business documents, and government records. A corporate network system 110 may include a corporate authorization server 140 used by the user devices to access the corporate network, one or more corporate servers 150, 160, 170, and one or more databases 145, 175. Data located on the one or more corporate servers 150, 160, and 170 or on the one or more databases 145, 175 can be accessed via the network 130, such as the Internet or Intranet. For example, the one or more user devices 120a to 120n can remotely access a server and/or database(s) associated with the corporate network system 110 via the network 130. The one or more user devices 120a to 120n may include computers such as a mobile device 120a, a desktop 120b, 120c or a laptop 120n.

To access the corporate network system 110, each of the one or more user devices 120a to 120n may require the user (e.g., an employee) to enter his or her credentials, such as a user name and password in a login prompt. The user credentials are sent by each user device to the corporate authorization server 140. The corporate authorization server 140 may compare the credentials provided by the user devices to the credentials stored for each user in a corporate database 145. If the credential provided by the user matches a credential stored on the corporate database 145, the corporate authorization server 140 can provide the user with access specified for the provided credential to a corporate network system 110.

The corporate authorization server 140 can determine that the one or more user devices 120*a* to 120*n* are being remotely operated at locations outside of a corporate office or building. For example, the corporate authorization server 140 can determine that one or more user devices 120*a* to 120*n* are being remotely operated in response to receiving a request to open a virtual private network (VPN) session. If the corporate authorization server 140 determines that a user device is being remotely operated, the corporate authorization server 140 can send a message that instructs the user device to operate in a data protection mode. In some embodiments, the data protection mode is enabled based upon the document that is being or requested to be accessed.

A data protection mode can describe hardware and/or software operations of the one or more user devices 120*a*-120*n* that enable the one or more user devices to present sensitive information e.g., about persons (also known as sensitive personal information) in a manner that may deter unauthorized copying or recording of the sensitive information. Sensitive information may include sensitive audio content (e.g., audio conveying social security number) and/or sensitive visual content (e.g., numeral representation of credit card number). In some embodiments, sensitive visual content may be displayed on a user device that operates in a data protection mode in which a frame rate associated with a monitor (or screen) of the user device is reduced. The frame rate quantifies a total number of frames displayed on the monitor over a pre-determined time period (e.g., 30 frames/second or 60 frames/second). By reducing the frame rate, an external device such as a person's mobile device camera may not be able to easily take a picture of the sensitive visual content displayed on the monitor. In some embodiments, a user device operating in a data protection mode may generate an image comprising the sensitive visual content and partition the image into multiple polygons so that each frame displayed the on monitor can include a different subset of the multiple polygons. Each of the one or more user devices 120*a*-120*n* can perform data protection mode related operations as further described in FIG. 2A.

Figure 2A:
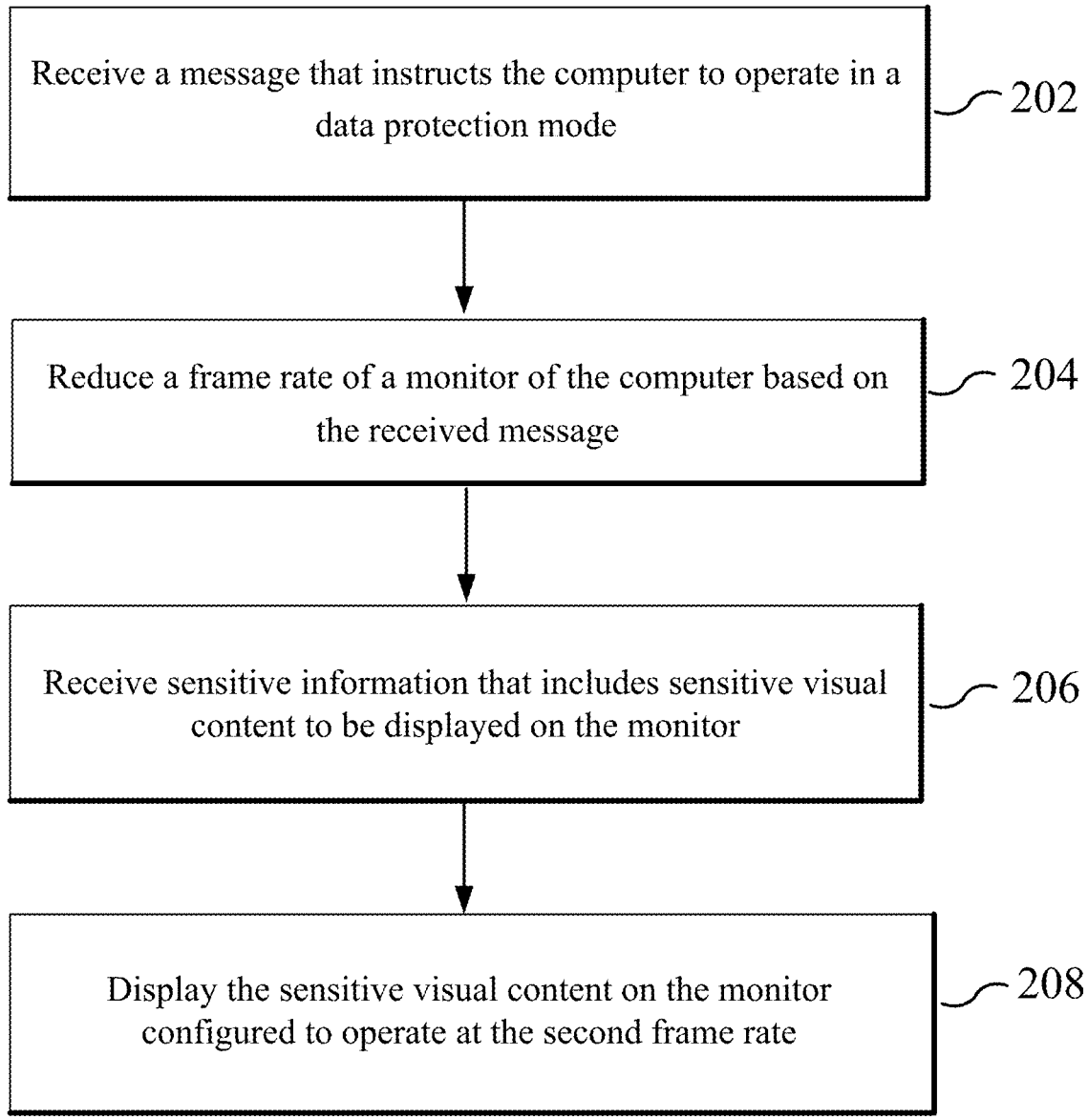
FIG. 2A shows an exemplary flow diagram performed by a user device to provide data protection.

FIG. 2A is a flow diagram with operations that can be performed by a user device to provide data protection. At the receiving operation 202, an image processing module (shown as 342 in FIG. 3) of the user device receives a message that instructs the user device to operate in a data protection mode. The message may be sent by a corporate authorization server when the user device logs into and accesses the corporate authorization server or when a VPN session is established between the user device and the corporate authorization server. In some embodiments, the message may include one or more pre-determined settings for the user device to operate in the data protection mode. For example, a setting may specify a pre-determined frame rate for the monitor (or screen) of the user device, where the pre-determined frame rate is lower than a default frame rate of the monitor. In an example implementation, the pre-determined frame rate may be 15 frames/second and the default frame rate may be 60 frames/second.

At the reducing operation 204, the image processing module reduces a frame rate of the monitor associated with the user device based on the received message. The image processing module enables the user device to operate in the data protection mode by reducing the frame rate of the monitor from a first frame rate (e.g., 60 frames/second) to a second lower frame rate (e.g., 15 frames/second). The second lower frame rate may be pre-determined for a data protection mode operating on a user device.

At the receiving operation 206, the image processing module receives sensitive information that may be about a person. For example, sensitive information may include audio or visual representation of social security number, credit card number, birthdate, home address, etc., of a person. In an example implementation, the image processing module may determine that the information received is considered sensitive by receiving an identifier (e.g., one or more bits, a flag) associated with the sensitive information that indicates that the information is sensitive and/or encrypted. At the displaying operation 208, the image processing module sends the sensitive visual content to be displayed on the monitor that is configured to operate at the second frame rate.

Figure 2B:
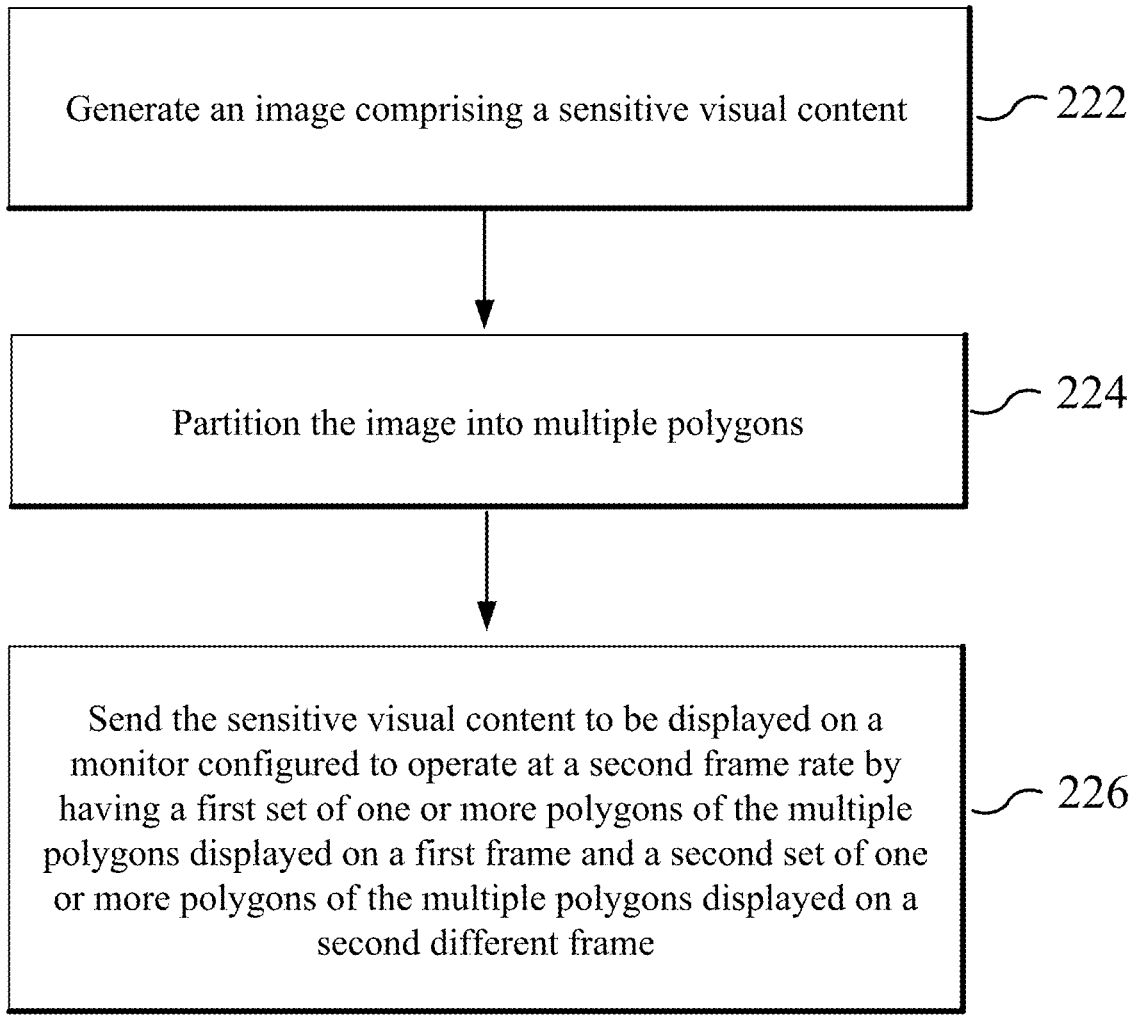
FIG. 2B shows another exemplary flow diagram performed by a user device to provide data protection.

FIG. 2B is another flow diagram with operations that can be performed by a user device to provide data protection. In some embodiments, the image processing module can generate an image comprising the sensitive visual content, partition the image into multiple polygons, and send the partitioned image to be displayed at the second frame rate so that each frame may include a different set of one or more polygons from the multiple polygons. At the generating operation 222, the image processing module receives the sensitive visual content and generates an image comprising the sensitive visual content. At the partitioning operation 224, the image processing module partitions the image into multiple polygons where each polygon includes a different region of the image. In some embodiments, the different regions of the multiple polygons may have at least some overlap.

At the sending operation 226, the image processing module can send the sensitive visual content to be displayed on a monitor configured to operate at the second frame rate (e.g., in the data protection mode) by having a first set of one or more polygons of the multiple polygons displayed on a first frame and by having a second set of one or more polygons of the multiple polygons displayed on a second different frame. The first set of one or more polygons is different from the second set of one or more polygons. Thus, each frame displayed on the monitor may include a different set of one or more polygons. For example, if an image comprising the sensitive visual content is partitioned into eight polygons identified by eight identifiers (e.g., ##1-8), and if a user device operates at a second frame of 15 frames/second, then frame #1 may include polygon ##1, 3, 5; frame #2 may include polygon ##2, 4, 6, 8, frame #3 may include polygon ##1, 2, 4, 5, 6, frame #4 may include polygon #2, frame #5 may include polygon ##2, 4, 5, etc.

II. Digital Eyeglasses for Data Protection

Section II describes systems, methods, and apparatuses to display sensitive visual content included in the sensitive information in a digital eyeglass, where the digital eyeglass can be worn by and can authenticate a remote employee. Referring to FIG. 1, in some embodiments, the corporate authorization server 140 may encrypt the sensitive visual content and send the encrypted visual content to a user device to be displayed to a remote employee.

The user device may be in communication with digital eyeglasses that may be worn by a remote employee via a wireless technology, such as Wi-Fi or Bluetooth. The digital eyeglasses module of the user device (shown as 344 in FIG. 3) can send the encrypted sensitive visual content to the digital eyeglasses. The digital eyeglasses may include a processor configured to decrypt the sensitive visual content display the sensitive visual content on a display (or projector) associated with the digital eyeglasses. In some implementations, the sensitive visual content is displayed upon authenticating the remote employee or user that operates the digital eyeglasses. The digital eyeglasses may obtain the decryption key from the user device or from the corporate authentication server and may store the decryption key in the digital eyeglasses' non-volatile memory. In some embodiments, the corporate authentication server may periodically change the encryption key and decryption key.

In some embodiments, the digital eyeglasses may display the sensitive visual content on its display if the digital eyeglasses authenticate the remote employee. The digital eyeglasses may authenticate the remote employee using biometric information of the remote employee (e.g., fingerprint or voice) or by including a camera that records eye movement of the remote employee or takes a retinal scan. The eye movement may be recorded in response to the monitor of the user device displaying a pattern (e.g., series of visible dots or text sequentially shown on different regions of the display) along with an instruction to the remote employee to follow the pattern with his or her eyes. In some other embodiments, the user device may authenticate the remote employee using, for example, biometric information or by recording eye movement using a camera included in the user device. In such embodiments, after the user device authenticate the remote employee, the user device sends the encrypted sensitive visual content to the digital eyeglasses to be decrypted and displayed.

III. Headphones for Data Protection

Section III describes systems, methods, and apparatus to present sensitive audio content included in the sensitive information in a headphone, where the headphone can be worn by a remote employee. Referring to FIG. 1, in some embodiments, the corporate authorization server 140 may generate a combined protected audio content by adding a pre-defined audio interference pattern to the sensitive audio content and send the combined protected audio content to a user device to be presented to a remote employee. The pre-defined audio interference pattern may be a pre-defined subsonic tone pattern.

The user device may be in communication with a headphone that may be worn by a remote employee via a wireless technology, such as Wi-Fi or Bluetooth. The headphone module of the user device (shown as 346 in FIG. 3) can send the combined protected audio content to the headphone. The headphone may include a processor configured to remove the pre-defined audio interference pattern from the combined protected audio content to obtain the sensitive audio content. In some embodiments, the headphone may include non-volatile memory that may store the pre-defined audio interference pattern, where the headphone may receive the pre-defined audio interference matter via the user device or via the corporate authorization server. The headphone may play the sensitive audio content via the headphone's speakers.

In some embodiments, the corporate authorization server may encrypt the combined protected audio content or the sensitive audio content. The headphone may receive the encrypted combined protected audio content or the encrypted sensitive audio content and decrypts such information to obtain the sensitive audio content. The headphone may obtain the decryption key from the user device or from the corporate authentication server and may store the decryption key in the headphone's non-volatile memory.

Figure 3:
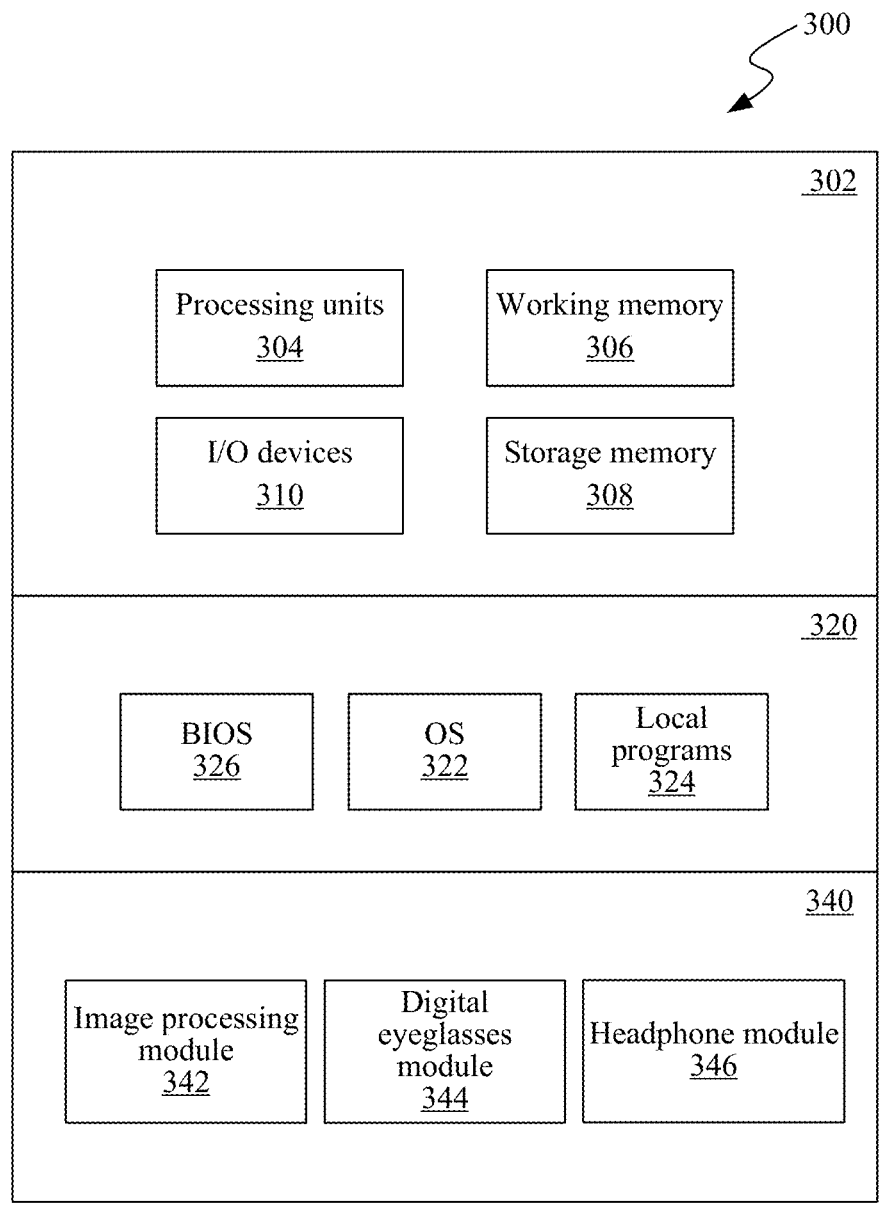
FIG. 3 is a block diagram illustrating an overview of devices on which some implementations of the disclosed technology can operate.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware, including processing units 304 (e.g., CPUs, GPUs, APUs, etc.), working memory 306, storage memory 308, and input and output devices 310. Some or all of the components 300 can be implemented on a user device (e.g., 120a-120n in FIG. 1). For example, a memory may store instructions that upon execution by the processing units 304 configure the user device to perform the operations described in FIGS. 2A-2C and/or in the various embodiments described in this patent document.

General software 320 can include various applications, including an operating system 322, local programs 324, and a basic input output system (BIOS) 326. Specialized components 340 can be subcomponents of a general software application 320, such as local programs 324. Specialized components 340 can include any one or more of an image processing module 342, digital eyeglasses module 344, and headphone module 346 as described in this patent document.

In some embodiments, a non-transitory computer-readable medium comprising computer-readable instructions for providing data protection is described. The computer-readable instructions comprising instructions that when executed by a processor causes the processor to implement a method described in FIGS. 1, 2A-2B, in the various embodiments, and/or operations of the modules described in this patent document.

Those skilled in the art will appreciate that the components illustrated in FIG. 1-2B described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A computer, comprising:
   a processor configured to:
      receive a message that instructs the computer to operate in a data protection mode;
      reduce a frame rate of a monitor of the computer based on the received message,
         wherein the computer is configured to operate in the data protection mode by being configured to reduce the frame rate from a first frame rate to a second frame rate,
         wherein the first frame rate is greater than the second frame rate, and
         wherein the frame rate quantifies a plurality of frames displayed on the monitor over a pre-determined time period;
      receive sensitive information that includes sensitive visual content to be displayed on the monitor;
      generate an image comprising the sensitive visual content;
      partition the image into multiple polygons, wherein each polygon includes a different region of the image; and
      display the sensitive visual content in the multiple polygons on the monitor configured to operate at the second frame rate.

2. The computer of claim 1, wherein the processor is further configured to:
   wherein the sensitive visual content is displayed on the monitor configured to operate at the second frame rate by having a first set of one or more polygons of the multiple polygons displayed on a first frame and by having a second set of one or more polygons of the multiple polygons displayed on a second different frame, and
   wherein the first set of one or more polygons is different from the second set of one or more polygons.

3. The computer of claim 1, wherein the processor is further configured to:
   send the sensitive visual content to digital eyeglasses, wherein the sensitive visual content is encrypted,
wherein the digital eyeglasses are configured to decrypt and display the sensitive visual content on a second monitor associated with the digital eyeglasses, and
wherein the sensitive visual content is displayed upon authenticating a user that operates the digital eyeglasses.

4. The computer of claim 3, wherein the digital eyeglasses is configured to authenticate the user by using biometric information obtained from the user.

5. The computer of claim 1,
wherein the sensitive information includes sensitive audio content added to an audio interference pattern,
wherein the processor is further configured to:
send the sensitive audio content with the audio interference pattern to a headphone, wherein the headphone is configured to remove the audio interference pattern and play the sensitive audio content.

6. The computer of claim 5,
wherein the sensitive audio content is encrypted, and
wherein the headphone is configured to decrypt the encrypted sensitive audio content and play the decrypted sensitive audio content.

7. A data protection method implemented in a computer, the method comprising:
receiving a message that instructs the computer to operate in a data protection mode;
reducing a frame rate of a monitor of the computer based on the received message,
wherein the computer operates in the data protection mode by reducing the frame rate from a first frame rate to a second frame rate,
wherein the first frame rate is greater than the second frame rate, and
wherein the frame rate quantifies a plurality of frames displayed on the monitor over a pre-determined time period;
receiving sensitive information that includes sensitive visual content to be displayed on the monitor;
generating an image comprising the sensitive visual content;
partitioning the image into multiple polygons, wherein each polygon includes a different region of the image; and
displaying the sensitive visual content in the multiple polygons on the monitor that operates at the second frame rate.

8. The method of claim 7, further comprising:
wherein the sensitive visual content is displayed on the monitor that operates at the second frame rate by having a first set of one or more polygons of the multiple polygons displayed on a first frame and by having a second set of one or more polygons of the multiple polygons displayed on a second different frame, and
wherein the first set of one or more polygons is different from the second set of one or more polygons.

9. The method of claim 7, further comprising:
sending the sensitive visual content to digital eyeglasses,
wherein the sensitive visual content is encrypted,
wherein the digital eyeglasses decrypt and display the sensitive visual content on a second monitor associated with the digital eyeglasses, and
wherein the sensitive visual content is displayed upon authenticating a user that operates the digital eyeglasses.

10. The method of claim 9, wherein the digital eyeglasses authenticates the user by using biometric information obtained from the user.

11. The method of claim 7, wherein the sensitive information includes sensitive audio content added to an audio interference pattern, and wherein the method further comprises:
sending the sensitive audio content with the audio interference pattern to a headphone, wherein the headphone removes the audio interference pattern and play the sensitive audio content.

12. The method of claim 11,
wherein the sensitive audio content is encrypted, and
wherein the headphone decrypts the encrypted sensitive audio content and plays the decrypted sensitive audio content.

13. A non-transitory computer-readable medium comprising computer-readable instructions for providing data protection, said computer-readable instructions comprising instructions that when executed by a processor causes the processor to implement a method comprising:
receiving a message that instructs a computer to operate in a data protection mode;
reducing a frame rate of a monitor of the computer based on the received message,
wherein the computer operates in the data protection mode by reducing the frame rate from a first frame rate to a second frame rate,
wherein the first frame rate is greater than the second frame rate, and
wherein the frame rate quantifies a plurality of frames displayed on the monitor over a pre-determined time period;
receiving sensitive information that includes sensitive visual content to be displayed on the monitor;
generating an image comprising the sensitive visual content;
partitioning the image into multiple polygons, wherein each polygon includes a different region of the image; and
displaying the sensitive visual content in the multiple polygons on the monitor that operates at the second frame rate.

14. The non-transitory computer-readable medium of claim 13, wherein the method further comprises:
wherein the sensitive visual content is displayed on the monitor that operates at the second frame rate by having a first set of one or more polygons of the multiple polygons displayed on a first frame and by having a second set of one or more polygons of the multiple polygons displayed on a second different frame, and
wherein the first set of one or more polygons is different from the second set of one or more polygons.

15. The non-transitory computer-readable medium of claim 13, wherein the method further comprises:
sending the sensitive visual content to digital eyeglasses,
wherein the sensitive visual content is encrypted,
wherein the digital eyeglasses decrypt and display the sensitive visual content on a second monitor associated with the digital eyeglasses, and
wherein the sensitive visual content is displayed upon authenticating a user that operates the digital eyeglasses.

16. The non-transitory computer-readable medium of claim 15, wherein the digital eyeglasses authenticates the user by using biometric information obtained from the user.

17. The non-transitory computer-readable medium of claim 13, wherein the sensitive information includes sensitive audio content added to an audio interference pattern, and wherein the method further comprises:

sending the sensitive audio content with the audio interference pattern to a headphone, wherein the headphone removes the audio interference pattern and play the sensitive audio content.

18. The non-transitory computer-readable medium of claim 17, wherein the sensitive audio content is encrypted, and wherein the headphone decrypts the encrypted sensitive audio content and plays the decrypted sensitive audio content.

\* \* \* \* \*